United States Patent [19]

Schütz

[11] 4,339,358
[45] Jul. 13, 1982

[54] PROCESS AND APPARATUS FOR RECLAIMING POLYURETHANES

[76] Inventor: Wilhelm Schütz, Josef-Ponten-Strasse 60, D-5100 Aachen, Fed. Rep. of Germany

[21] Appl. No.: 218,260

[22] Filed: Dec. 19, 1980

[30] Foreign Application Priority Data

Dec. 21, 1979 [DE] Fed. Rep. of Germany ....... 2951617

[51] Int. Cl.$^3$ ............................ C08J 3/00; C08J 11/04
[52] U.S. Cl. .................................. 521/49.5; 525/453; 528/67; 422/184; 568/700; 521/49
[58] Field of Search ......................................... 260/2.3

[56] References Cited

U.S. PATENT DOCUMENTS

| | | | |
|---|---|---|---|
| 2,937,151 | 5/1960 | Broeck et al. | 260/2.3 |
| 3,123,577 | 3/1964 | Heiss | 260/2.3 |
| 4,014,809 | 3/1977 | Kondo et al. | 260/2.3 |
| 4,267,078 | 5/1981 | Lidy et al. | 260/2.3 |

Primary Examiner—Wilbert J. Briggs, Sr.
Attorney, Agent, or Firm—Roylance, Abrams, Berdo & Farley

[57] ABSTRACT

A process and apparatus are provided for the treatment of waste polyurethane particles by alcoholysis or acidolysis. The particles are treated with a solvent at a reaction temperature within the range of 120° C. to 200° C. while being subjected to comminution until the particles are liquified. The resultant liquified product may be converted to a polyurethane by treatment with a polyisocyanate. An apparatus for conducting this process includes shaped blades and fixed heated elements for exerting strong shear forces on the particles or fragments of polyurethane.

9 Claims, 3 Drawing Figures

PROCESS AND APPARATUS FOR RECLAIMING POLYURETHANES

This invention relates to a process and apparatus for the treatment of waste polyurethanes by alcoholysis or acidolysis in which the polyurethane is first comminuted mechanically and subsequently reacted with solvents at a temperature of above 120° C. Such a process is described in U.S. Pat. No. 2,937,151, the disclosure of which is incorporated herein by reference. Because of the poor wettability of the starting material with solvents and because of the low accessibility of the solvent from the outer particle surfaces to the inner particle surfaces of the cellular material, U.S. Pat. No. 2,937,151 proposes to reduce the time required for the solvent action to take place by a preliminary comminution of the starting polyurethane by means of cutting devices and edge mills. A pre-comminution of the starting polyurethane shortens the dissolving time but produces welds which render it difficult for a solvent to penetrate and which results in insufficient decomposition of the polyurethane particles. In the process described in U.S. Pat. No. 2,937,151, the scrap polyurethane dissolves only at temperatures of above 250° C. Such high temperatures lead to discoloration, reducing the quality of the reclaimed material. Further, up to 10% undissolved residue of the starting material remains. Finally, this process does not permit a continuous method of operation.

U.S. Pat. No. 3,123,577, the disclosure of which is incorporated herein by reference, discloses a process for the treatment of a polyurethane according to which, in order to achieve shorter dissolving times of the scrap cellular polyurethane, scrap polyurethane is comminuted by a roller mill having two rollers. This results in a better wetting of the polyurethane. The polyurethane is comminuted by means of variable revolutions per minute (rpm's) of the rollers. No agglomerates are thus obtained. Although this process improves the wettability of the polyurethane, the process requires the use of organic solvents and catalysts. Further, reaction temperatures of 200° C. or more are required in order to achieve the desired shorter dissolving times. Finally, the preliminary crushing accomplished in this process does not lead to a complete liquification of the starting material so that a solid residue results which will impair the yield of the desired product.

In accordance with the present invention, there is provided a process for the treatment of polyurethane which in a short time leads to a complete solution of the starting polyurethane without any quality impairment such as discolorations occurring thereby and which does not result in any remaining undissolved residue. In this process, the starting polyurethane is treated with a solvent at a reaction temperature of below 200° C. while being subjected to mechanical comminution. Preferably, the starting polyurethane is already in a state of chemical decomposition. Contrary to prior art processes, neither the type nor degree of mechanical comminution is of significance for the dissolving process. The starting polyurethane may, for example, be crushed mechanically on cutting mills, whereby welds and sealing in the starting polyurethane are avoided. The polyurethane treated in accordance with this invention may be the same as those described in U.S. Pat. Nos. 2,937,151 and 3,123,577.

The continuation of the mechanical comminution or crushing during the solvent treatment results in the production of strong shearing forces which have a significant influence on the process. Because of the stress on the polyurethane particles being treated and dissolved, their outer and inner surfaces are rendered more accessible and as a result of the shearing forces, an increased solvent contact is simultaneously achieved as a result of which the reaction dissolving times are shortened without the necessity for using a reaction temperature of over 200° C. which results in discolorations.

According to one embodiment of this invention, the reaction mixture, i.e., the starting polyurethane and the solvents, is subjected to mechanical crushing and chemical decomposition in a counter-current flow of protective gas to prevent oxidation. The gas flows through the reaction zone and at the same time draws off vapors and gases liberated from the reaction mixture.

According to another embodiment of this invention, the starting polyurethane has a particle size of up to 30 mm. and is fed while being mixed with polyols such as disclosed in U.S. Pat. No. 2,937,151 to the reaction zone which is preferably operated at greater than atmospheric pressure.

During the process, oxidation may be minimized by evacuation of the atmosphere surrounding the starting mixture and feeding in nitrogen gas as a protective gas in a counter-current manner. Wetting of the starting polyurethane may be improved by mixing it with a polyol prior to introducing the mixture into the reaction zone. Thereby, a subsequent agglomeration and welding of the pre-crushed starting polyurethane is prevented and wetting is improved.

The alcoholysis products resulting from the process of this invention may be further treated with polyisocyanates such as isophorondiisocyanate, trimethylhexamethylene diisocyanate, cyclohexylene-1,4-diisocyanate and other aliphatic polyisocyanates. The alcoholysis products resulting from the process of this invention may also be treated with adducts of polyisocyanates, such as isophorondiisocyanate, hexamethylene diisocyanate, trimethylhexamethylene diisocyanate, cyclohexane diisocyanate, toluene diisocyanate, diphenylmethane diisocyanate and others with polyols such as trimethylolmethane, trimethylolpropane, ethyleneglycol, propyleneglycol, 1,4-butanediol, neopentylglycol, pentaerythritol and others to convert the alcoholysis products into polyurethanes. Further, the alcoholysis decomposition products produced by the process of this invention may be converted into polyurethanes by treatment at a ratio of 1:3 to 3:1 with a mixture of aliphatic polyisocyanates with aromatic polyisocyanates, such as toluene diisocyanate, diphenyldiisocyanate, naphthyl diisocyanate, etc.

The process of this invention may be conducted in an apparatus which has at least one mixer to which starting polyurethane may be charged from a supply container and which is connected to a low pressure and/or reactor. Shearing elements, which are rotatable in both directions and which exert shearing forces on the starting polyurethane, are disposed inside the reactor on a heatable, hollow shaft for continuous mechanical comminution or crushing during the solvent treatment. These shearing elements are surrounded by a jacket composed of hollow, heatable sectors.

The use of the apparatus of this invention results in an improvement of heat transfer to the mass of starting polyurethane to be dissolved. A uniform distribution of temperature between 150° C. and 200° C. may be achieved in the reactor. Because of the uniform temperature distribution, such temperatures are sufficient to carry out the process with relatively short reaction and dissolving times. The use of reaction temperatures below 200° C. assures that discolorations of the starting material as a result of decomposition of amino compounds will not be obtained.

It is preferred to use as the apparatus of this invention a standard reactor operated at a temperature of from about 150° C. to 200° C. to which a means is attached for introducing a protective gas such as nitrogen. The reactor may also be designed for vacuum or superatmospheric pressure operation. The apparatus may be designed for a continuous or a batch operation.

In accordance with one embodiment of the apparatus of this invention, a low pressure reactor is provided to which a protective gas circuit is connected, guided via the mixer which is in connection with a condenser and a vacuum device, preferably consisting of a pump and a hydrocyclone.

In another embodiment of this invention, an apparatus is provided comprising an agitating horizontally disposed low pressure boiler reactor connected with a protective gas circuit attached to the bottom outlet thereof via a pump and a valve.

In accordance with another embodiment of this invention, the apparatus comprises a high pressure reactor connected with a protective gas circuit and including an agitator autoclave. The reactor may be charged from the bottom outlet of the reactor via a high pressure pump.

In order to standardize the temperature distribution in the reactor, it is preferred that the reactor have insertion elements as well as mixing and crushing devices heatable by way of an annular line and being equipped with dip pipes.

In order to obtain intensively acting shearing forces in the reaction space for the improvement of the material transfer, a further embodiment of the apparatus in accordance with the invention provides for the mixing and crushing devices to be equipped with blades mounted on a shaft so as to be rotatable in a reactor, each blade having its end bent backwardly and having its upper and lower sides or flanks roughened, the backward bending causing the distal ends of the blades to form conical gaps of periodically changing width with respect to inserts in the reactor and with the inside wall of the reactor.

Finally, an embodiment of an apparatus in accordance with the invention provides for a single, discontinuously operable, horizontal high pressure reactor.

The invention provides for the possibility of using, as a starting material for the process, polyurethane which is crushed only to a maximum particle size of 30 mm. Advantageously, the precrushing of the starting material takes place by the material being mixed with a portion of the polyols, used later as a solvent component, in a heatable kneading mixture with two contra-rotating shafts with sigma blades. This results in a good pre-wetting of the polyurethane particle surfaces with solvent, liberation of a part of the gasses which are enclosed in the polyurethane cells, reduction of the harmful oxygen content and, particularly, avoiding of agglomeration of the polyurethane particles by subsequent mechanical stresses in the subsequent reaction zone. Furthermore, the dosability and the heat conductivity of the mass of starting material is decisively increased.

The significant and extensive removal of the oxygen can be accomplished by subsequent evacuation of the mix in the same part of the installation or by subsequent flushing with a protective gas such as nitrogen at standard pressure, or both, with the mixer being effectively equipped with a discharge worm and being separated by a vacuum-tight cell-wheel from the remaining mixing space. Thus, the wetted mix can be inserted directly into the feed space of the reactor at precise dosing.

By using counterrotating and self-cleaning shafts, which are equipped with mixing and feed elements, it is possible to produce strong shearing fields in the succeeding reactor. The solvent is brought intensively to the surface of the polyurethane fragments by filling the reactor space in excess of 65% and by optimal rotational speed at turbulent locally constant flow conditions, and, as a result of further shearing of the particles, the solvent also comes into contact with the inner marginal surfaces of the phases so that a greater material exchange surface develops than in the case of simple wetting, both for the decomposition reaction as well as for the dissolving process. From this follows an increased material transfer which leads to a shortening of the reaction and of the dissolving times.

The mixing and kneading tools of the invention inside the reactor differ from customary devices of this type in that they have friction surfaces on the flanks of the blades, baffles, strips, cleaning elements, and other components, which exert a shreading effect on the elastic particles and agglomerates which can, in spite of all efforts, still possibly develop. Areas of the blade segments, of the flanks of the strips, and of cleaning segments permit conical gaps to develop between themselves and the reactor wall so that, at least in the beginning of the chemical decomposition and in parallel thereto, the mechanical crushing of the polyurethane particles is continued. The process of the invention, therefore, not only has the advantage that one can do away with expensive fine-crushing of the polyurethane fragments for preparation of the starting material but, also, that the mechanical crushing, continued during the solvent treatment, continuously creates new surfaces so that the reaction is made intensive and the reaction time is correspondingly shortened.

As a result of the heating of the inside volume of the reactor, in accordance with the invention, through the outside wall as well as through the mixing and kneading tools, the shearing inserts and the shafts, it is possible to achieve an enlarged total heat-exchange surface as compared to customary reactors. In connection with the flow conditions created by the process of the invention and with the improved heat conductivity of the polyurethane mass, the heat transfer and the convective heat transport will be considerably improved so that uniform reaction temperature at the selected, required level, can be adjusted with a precision of ±1° C. Thus, one is able, on the one hand, to prevent damage from overheating on the contact surfaces and, on the other hand, maintain relatively low reaction temperatures so that discolorations as a result of decomposition of the amines will be avoided.

Because a protective gas such as, for example, nitrogen, flows countercurrently through and over the reaction mix, this gas prevents oxidation and, additionally, serves as a carrier gas for the vapors and gases which are liberated in the reactor from the starting material. It is possible for the starting material to have absorbed liquids of various kinds during its original use and also during storage as waste, these liquids being, e.g., water, possibly harmful on the alcoholysis as a result of hydrolysis. According to the invention, these harmful substances are drawn off together with the nitrogen through a steam space in the reactor and are possibly precipitated in a series-connected condenser and are eliminated from the system circulation. It is similarly possible to remove traces of oxygen, to the extent that they are found, with the help of the nitrogen. It will be apparent that a nitrogen exchange is to be carried out in the circulation whenever it is needed. In order to minimize expense, when large quantities of nitrogen are to be used, it may also be advantageous to include regeneration of the nitrogen for recycling thereof.

According to the invention, a continuously operating low pressure reactor with nitrogen circulation, supplementing the entire installation by a discontinuously operating high pressure reactor as part of the installation, may also be used. However, a high pressure reactor can also be provided as a replacement for the low pressure reactor.

For the low pressure part of the apparatus, any reactor usable for carrying out low pressure reactions is suitable and for carrying out the process of the invention, the reactor must be equipped with apparatus for the production of strong shearing fields, must have relatively large heating surfaces, and will possibly permit the differentiated heating of individual zones.

In the high pressure part of the apparatus of the invention, per se, any agitator boiler autoclave of customary construction can be used so long as it is equipped with certain mixing and shearing tools which produce the above-mentioned, desired, shearing fields. It is essential for the invention that the mixing and shearing tools exert a shredding effect as a result of roughened shearing surfaces and conical shearing gaps.

When the system employs the exclusive execution of a high pressure process, a horizontal reactor which is designed for pressures up to 50 bar is particularly suitable in the case of a discontinuous method of operation.

The polyurethane alcoholysis decomposition products obtained by the process of this invention may be further treated by using special polyisocyanates. Polyurethane foam plastics and polyurethane thermoplastics may be thus produced. Especially preferred polyisocyanates which may be used to further treat the alcoholysis products include isophoron diisocyanate, cyclohexane-1,4-diisocyanate, trimethylhexamethylene diisocyanate and other aliphatic polyisocyanates. The low reactivity of aliphatic isocyanates with alcoholic hydroxyl groups is more than compensated for by the high reactivity of the free amino groups present in the alcoholysis products. The use of isophoron diisocyanate is preferred for the production of polyurethane foam plastics over the use of such aromatic polyisocyanates as toluene diisocyanate and other diisocyanates. The fact that aliphatic isocyanates can be thus used in the production of polyurethane is an advantage of this invention since polyurethanes produced from aliphatic polyisocyanates possess increased thermal stability and light stability as compared to polyurethanes produced from aromatic polyisocyanates.

The polyurethane alcoholysis decomposition products may also be converted into polyurethanes by treatment with adducts of such polyisocyanates as isophoron diisocyanate, hexamethylene diisocyanate, trimethylenehexamethylene diisocyanate, toluene diisocyanate, diphenylmethane diisocyanate, cyclohexane diisocyanates, etc. in combination with such polyols as trimethylol methane, trimethylol propane, ethylene glycol, propylene glycol, 1,4-butane diol, neopentyl glycol, pentaerythritol, etc. The use of such adducts makes it possible to create a reactant with three functional groups whereby a higher degree of cross-linking will be achieved in the end products. A considerable expansion of the characteristics of the recycled products is thereby provided.

When using agitator boiler reactors instead of horizontal reactors, the inserts therein are provided to fulfill certain constructional limiting conditions which are prescribed by the characteristic geometry numbers. It is essential to the invention that these characteristic numbers should lie within the following listed ranges wherein:

D is the reactor diameter;
d is the agitator circle diameter;
c is the bottom clearance;
s is the width of the inserts;
h is the width of each agitator blade; and
H is the filling level.

The locations of these dimensions are shown in FIGS. 2 and 3.

The characteristic numbers, setting forth the relationships between these dimensions, are ratios of the factors, as follows:

D/d is between about 2.2 and about 3.2;
c/d is between about 0.23 and about 0.83;
f/d is between about 0.3 and about 0.55;
h/d is between about 0.4 and about 1.0; and
H/D is between about 0.8 and about 1.0.

The number of baffle plates can be 4, 6 or 8.

Test value transducors or generators and dosing lines for injecting gases and fluids into the reactor are integrated into the baffle plates. Each supply of additive substances takes place in the fluid state into the vicinity of the agitator blades. Advantageously, a modified impeller agitator is used as a stirrer, the three blades of this impeller being not bent continuously but being formed so that they extend radially from the shaft and are bent backward only in the last third of their length. As a result, a better self-centering of the agitator is achieved, even in the case of strong shearing fields which form near the baffle plates. The improvement of the dissolving process is achieved in accordance with the invention by the production of hyperbolic shearing fields with the ring whirls. The above-listed ranges of characteristic numbers insure achievement of this goal in conjunction with turbulent fluid flow which is achieved at $Re_M = 30$ in the case of constant flow parameters.

It will be apparent that the use of the secondary energy from the circulation and product streams for heating the mixer will reduce the energy requirements of the process, and it will also be apparent that fluctuations in the energy budget of the reactor are balanced out by a selective load on the heating surfaces and maintaining as low a reaction temperature as possible.

Apparatus for accomplishing the method in accordance with the invention are shown in the accompanying drawings, which form a part of this specification, and wherein.

Figure 1:
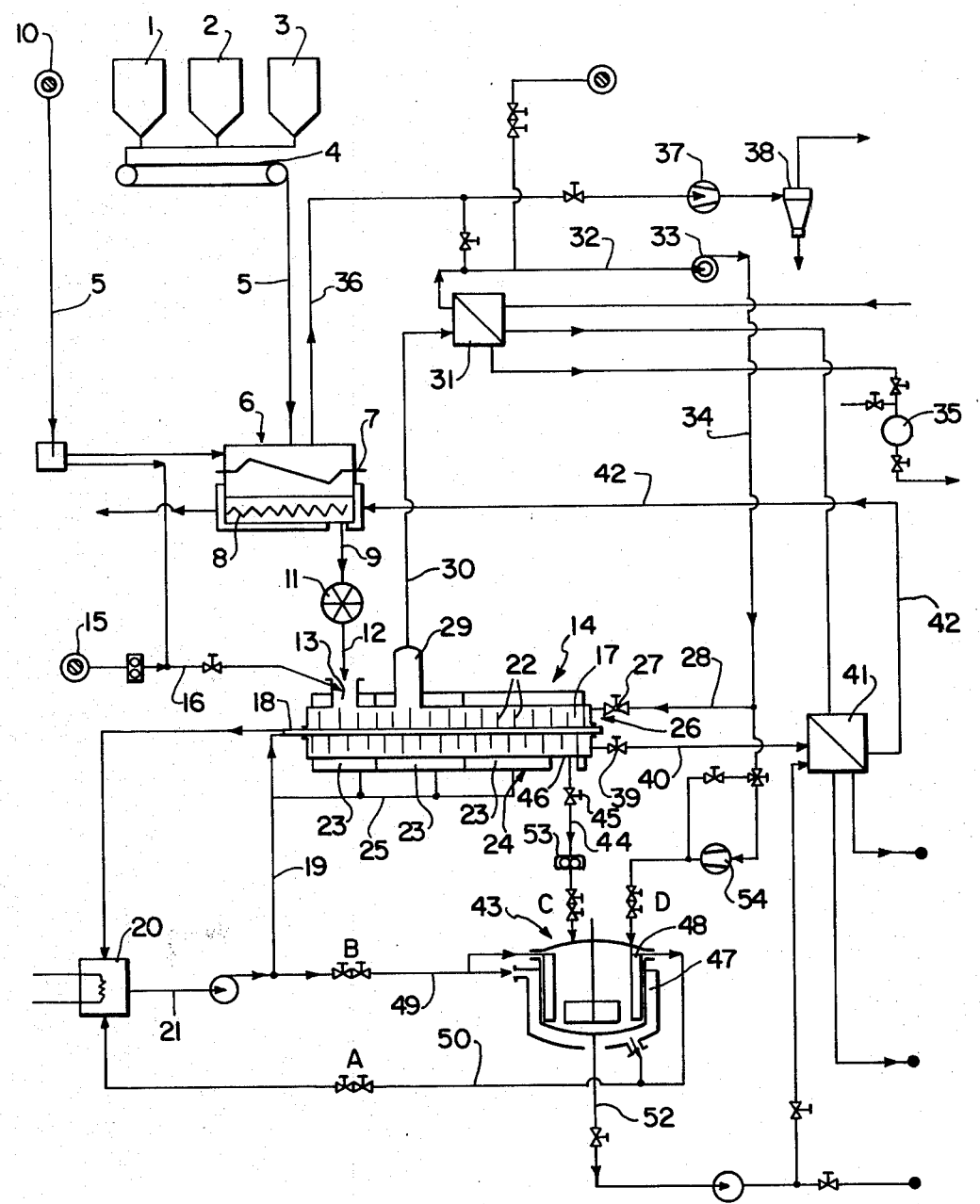
FIG. 1 is a schematic flow diagram showing various components of an apparatus in accordance with the invention.

Referring now to the apparatus as shown in the figures, supply containers 1, 2 and 3 deposit pre-crushed polyurethane upon an endless revolving conveyor belt 4 which delivers material along a path 5 to a heatable mixer 6 in which mixing rollers 7 and a discharge worm 8 are disposed. While pre-crushed polyurethane wastes and/or polyurethane powder is fed to the mixer 6 by path 5, the first action of the starting material with polyolene from a supply vessel 10 takes place via an additional path 5' leading to the mixer 6. The dosing is accomplished in accordance with a predetermined mixing ratio which can vary depending upon the method of operation and wherein the mixing ratio in the starting phase of the process amounts, for example, to about 1:1.

Depending on the mixing time, the volume of the mixer 6 is selected such that the starting material flows by way of discharge worm 8 continuously along a line 9 to a cell wheel 11 and alone line 12 to the feed connection 13 of a reactor indicated generally at 14. Additional additives and supplementing quantities of polyol are delivered to the inside of reactor 14 from a dosing station 15 through a line 16 and change the starting material, already mixed with polyols, into a reaction mixture so that the interior space 17 of reactor 14, upon achieving the continuous method of operation, contains a liquified mixture. The subsequently fed-in starting material no longer need be dosed into pre-heated solvent as is the case in the known processes.

As will be recognized, the starting mixture in the heated up condition can be pure solvent, a mixture with an excess of solvent or the previously described mixture in the starting phase of the process or in the case of discontinuous operation of reactor 14. The apparatus of the invention permits numerous such variations of the process.

The reactor 14 is developed as a horizontal reactor for carrying out the low pressure process, and has two mixing and kneading shafts 18 which are hollow and which are heated by a heating medium delivered on lines 19 and 21. The mixing and kneading shafts, disposed side by side with their axes in parallel relationship, carry intensively acting shearing elements 22 which can be driven in either direction.

The interior volume 17 of reactor 14 is enclosed by a jacket 24, composed of hollow, heatable sections 23 which can be heated by a heating agent delivered through line 25 which branches off from line 19. The sections 23 of the reactor jacket 24 make possible a differentiated energy supply to selected individual areas of reactor 14. Using known control devices, any desired reaction temperature between 150° C. and 200° C. can be achieved with a precision of ±1° C.

The normal operation of the low pressure process beginning with the fact that the supplied starting material will be completely decomposed and liquified by alcoholysis in reactor 14. At the same time, nitrogen flows in countercurrent through the reaction masses. The $N_2$-gas enters at the front side 26 of the reactor 14 through a line 28, equipped with a valve 27, into the interior volume 17 of the reactor and is drawn off through a steam collecting space 29, via a line 30, a condensor 31 and a line 32, with the aid of a ventilator 33, and is fed along a line 34 to line 28 for redelivery to the interior space 17 of the reactor. The stream of gas thus guided in a circulatory path flows together with the absorbed reaction vapors and liberated gases from the cells of the starting material, and through the condensor 31, which is preferably water-cooled, and wherein the condensable vapors are separated and are diverted to a collecting container 35.

A vacuum apparatus is connected to the inside volume 17 of the reactor, to the condenser 31, and, by way of a line 36, also to the mixer 6, this apparatus consisting of a ring pump 37 for fluid and of a hydrocyclone 38. The mixer 6 and the interior volume 17 of reactor can be operated under a vacuum with this apparatus. In the usual case, the vacuum operation is limited to the mixer 6, and it is discontinuous and of short duration, always followed by flushing with nitrogen gas. The average operating pressure of the vacuum apparatus amounts to 1 bar.

The liquid alcoholysis products are drawn off through a line 40 equipped with a valve 39, from the front end 26 of reactor 14 and are cooled down to ambient temperature in a heat exchanger 41. The secondary energy extracted through the action of heat exchanger 41 is fed to the mixer 6 for heating that mixer, through a line 42.

The low pressure products previously described can be supplied to an agitator boiler reactor 43 which is connected to the bottom outlet 46 of reactor 14 by a line 44 having therein a valve 45.

The supplementation of the installation by the agitator boiler reactor 43, which is equipped inside and out with heating arrangements 47 and 48, which are supplied by a heating medium circulating through lines 49 and 50, makes possible a partial decomposition of the starting material within a shortened tarry time within reactor 14 since the mixing fluid is fed to the agitator boiler reactor 43 at reaction temperature and low pressure, and is further decomposed and dissolved therein under the same reaction conditions. There are various advantages offsetting the additional installation costs, since the reactor 14 can be used better, for example, for the first phase of the chemical and physical decomposition of the starting material, while the conclusion of the decomposition reactions and the dissolving process can be completed with the expenditure of less energy. Furthermore, subsequent addition of material components are possible to influence actions in the chemical decomposition. Finally, a plurality of smaller agitator boiler reactors can also be used instead of one agitator boiler reactor 43, so that the production of different end products of the alcoholysis is possible.

The connection of the agitator boiler 43 with the protective gas circuit and the heating plant corresponds to that which will be described in the following paragraphs for the high pressure portion of the system.

For carrying out the standard high pressure process of the invention, the agitator boiler reactor is replaced in the arrangement of the apparatus by a high pressure reactor such as, for example, an agitator autoclave. The connection of the agitator autoclave is accomplished by connection to the positions of the previously described devices designated A, B, C and D. The high pressure reactor is likewise charged from the low pressure reactor 14 through valve 45 connected to the bottom outlets 46 for which a high pressure pump 53 is provided in line 44.

The low pressure reactor 14, in this embodiment of the process, making use of its potentials, serves for the physical decomposition of the starting material as a preliminary step of the heat transfer at temperatures barely below the boiling point of the alcohols used.

Since the high pressure process operates with an excess of alcoholic solvents, a mixed fluid movable with pumps is formed. Since the further chemical decomposition of the starting material is carried out in the high pressure reactor, no complete liquification of the intermediate product is required in the low pressure reactor 14. In the high pressure reactor, pressures up to 50 bar and more are used at temperatures between 150° C. and 200° C. in the fluid aggregate state of the solvents. The connection with the protective gas circuit is accomplished at intersection point D, from which line 51 is provided with a compressor 54. The connections of lines 49 and 50 to the heating circuit of the heating plate 20 is accomplished at connecting point A and B.

Figure 2:
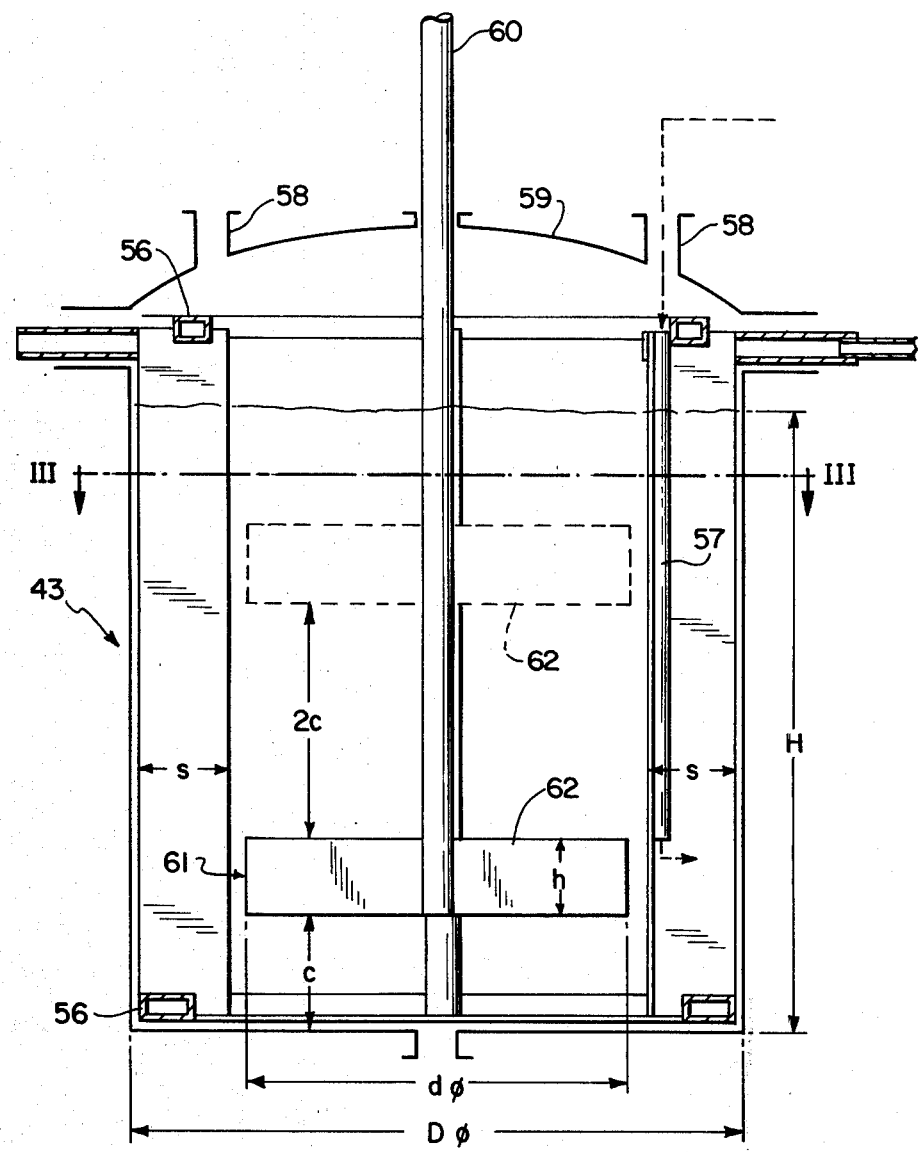
FIG. 2 is a schematic side elevation, in section, of an agitator reactor in accordance with the invention.
Figure 3:
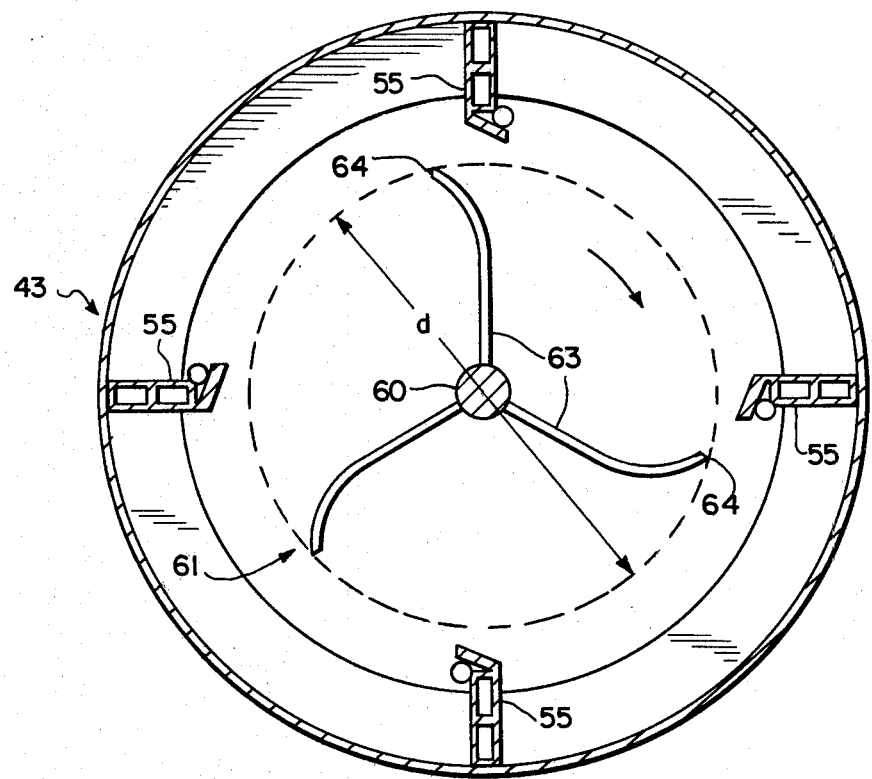
FIG. 3 is a plan view, in section, along line III—III of FIG. 2.

As shown in FIGS. 2 and 3, the material transportation in the dissolving process in either the agitator autoclave or the low pressure agitator boiler is accomplished best by special insert elements 55. The inserts 55 are heatable by annular conduits 56 at the upper and lower extremes thereof and the inserts are provided with passages for immersion plates 57 through which additive substances can be injected into the reactor space and in which measuring value generators or transducers can be provided. The positioning of connecting pipes 53 and other entrances in the cover 59 of the reactor are dependent upon the arrangement of the insert elements 55 therein.

Shearing elements indicated generally at 61, are mounted on a rotatable driven shaft 60, have roughened flanks 62, and the blades 63 of the shearing elements 61 are bent backward at their ends so that the free ends 64 of the blades form roughly conical gaps of periodically changing width with the insert elements 55 and the inside reactor wall as the shearing elements rotate.

In a manner analogous to the low pressure process, the thermal energy of the alcoholysis products of the high pressure process can be recaptured by heat exchange. Superfluous solvent portions are separated, using known separating processes, and are recycled into the process.

In the discontinuous high pressure process, a horizontal high pressure reactor is used instead of the previously described low pressure reactor 14. The only significant difference in the embodiments of these two types of devices installed in the systems resides in the thickness of the walls and the strength of the armatures required for the high pressures. The agitator boiler reactor 43 may, at the same time, be omitted.

The following examples illustrate the practice of this invention:

Example 1

The polyurethane waste used in this example is a polyurethane foam plastic made by reacting a polypropylene polyol having a molecular weight of about 2000 and a hydroxyl number of about 56 and toluene diisocyanate (about 80% of the 2,4-isomer). The polyurethane has the following characteristics:
  Crude density: 35 kg/m$^3$
  Tensile strength: 1.3 kp/cm$^2$
  Extension at break: 250%
This polyurethane waste is decomposed by low pressure alcoholysis according to the following procedures:

A. Discontinuous Method of Operation

In the mixer 6, 1000 parts of the polyurethane foam plastic particles having a particle size from 0 to 30 mm. are added over a short period of time to a mixture of 1000 parts of polypropylene polyol having a molecular weight of about 2000 and a hydroxyl number of about 56 and 45 parts of dibutyltin dilaurate which had been melted at 50° to 60° C. The whole mixture is mixed under continuous flushing with nitrogen gas for two to three minutes. This mixing is conducted while the discharge worm 8 moves backwards in order to support the mixing effect. The mixture assumes the temperature of the heated mixture walls. After the mixture is prepared, the discharge worm 8 moves forward and the mixed material, i.e., the polyurethane wetted with polyol, is passed via the vacuum-tight sluice wheel 11 into the reactor 14. Already present in the reactor 14 is a mixture of 1000 parts of polypropylene polyol having a molecular weight of about 2000 and a hydroxyl number of about 56 and 25 parts of dibutyltin dilaurate, which mixture has already been preheated to the reaction temperature of 180° C. The reaction time is 10 minutes. The quantities of reactants are such that the inside space 17 of the reactor 14 is filled up to 75% after the addition of the polyurethane-polypropylene polyol-dibutyltin dilaurate mixture. During this phase and during the course of the succeeding reaction, nitrogen gas is passed continuously in countercurrent fashion through the reactor 14. At the beginning of the reaction, the chemical decomposition reaction is supported by a simultaneous mechanical crushing of the polyurethane particles by shearing at Fronde numbers of about 0.25—calculated according to $Fr=(R\omega^2/g)^{0.5}$. This value corresponds in the case of the reactor used to an rpm of the shafts of 20 m$^{-1}$. During the course of the decomposition reaction which lasts for about 50 to 75 minutes to achieve complete liquifaction of the decomposition products, the Fr number is increased to values between 0.75 and 1.0. At the same time, an increase of the heat passage value k from 30 to 50 k cal/m$^2$hK is achieved. There is thus obtained a product completely soluble in ethanol. To 100 parts of the reaction product, i.e., the alcoholysis product obtained by the process just described, are added one part of a silicone base surface active substance, 0.35 parts of morpholine, 3.3 parts of water and 65 parts of isophorondiisocyanate. After thorough mixing in the agitator vessel and pouring into a mold, there is obtained a foam plastic which after four days shows the following characteristics:
  Crude density: 42 kg/m$^3$
  Tensile strength: 1.2 kp/cm$^2$
  Extension at break: 250%

B. Continuous Method of Operation

The same starting mixture as described in the preceding paragraph without addition of the solvent is placed into the reactor 14 which is initially empty and which is heated at Fr numbers of 0.2 to the reaction temperature of 180° C. The pre-wetted starting material is continuously fed to the reactor 14 until the inside space of the reactor 14 is filled up to 75% with liquified decomposition products. At the same time, the Fr numbers are raised to about 0.75. After about 70 to 80 minutes, the conversion point for continuous operation has been reached with liquifaction of the fed-in pre-wetted starting material. A quantity is drawn off and is replaced by the addition to the reaction zone of a corresponding quantity of pre-wetted starting material. By this method of operation, a decomposition product is obtained which is completely soluble in methanol. Less solvent is consumed by this process. Further processing of the decomposition product is accomplished as in part (A) of this example. Foam plastic products with similar properties are thus obtained.

Example 2

The processes of Examples 1(A) and 1(B) are repeated except that 100 parts of the decomposition product are mixed with 50 parts of the adduct of toluene diisocyanate and trimethylolpropane as well as with 30 parts of isophorondiisocyanate in agitator boiler reactor 43. This mixture is homogenized in order to obtain hard foam plastics.

Example 3

By the process of Example 1(A), following the addition to 100 parts of the reaction or alcoholysis product of 0.3 parts of morpholine, 3.3 parts of water and 65 parts of isophorondiisocyanate there are added modified fatty carboxylic acids and/or higher fatty acids. There is thus obtained a soft foamed plastic which is highly absorptive which may be used, for example, to remove petroleum and other oils from the surface of water.

While certain advantageous embodiments have been chosen to illustrate the invention it will be understood by those skilled in the art that various changes and modifications can be made therein without departing from the scope of the invention as defined in the appended claims.

I claim:

1. In a process for the treatment of waste polyurethane particles by alcoholysis or acidolysis wherein said particles are treated with a solvent at a temperature in excess of 120° C., the improvement which comprises subjecting said particles to comminution at least at the beginning of said treatment at a reaction temperature below about 200° C. and continuing comminution during said treatment, said treatment being conducted in an inert atmosphere of a counter-current flow of a protective gas, whereby gas flushes through the reaction zone preventing oxidation and drawing off vapors and gasses formed during said treatment.

2. A process as defined in claim 1 wherein said particles have a diameter of up to 30 mm and are fed to a reaction zone operated at above atmospheric pressure while mixing with a polyol.

3. A process as defined in claim 1 wherein the resultant liquified product is further treated with a polyisocyanate.

4. A process as defined in claim 3 wherein said polyisocyanate is selected from the group consisting of isophorondiisocyanate, trimethyl hexamethylene diisocyanate, cyclohexylene-1,4-diisocyanate and hexamethylene diisocyanate.

5. A process as defined in claim 1 wherein the resultant liquified product is converted into a polyurethane by reaction with a polyol adduct of a polyisocyanate.

6. A process as defined in claim 5 wherein the polyisocyanate is selected from the group consisting of isophorondiisocyanate, hexamethylendiisocyanate, trimethyl-hexamethylene diisocyanate, cyclohexane diisocyanate, toluyl diisocyanate and diphenylmethane diisocyanate and wherein the polyol is selected from the group consisting of trimethylolmethane, trimethylolpropane, ethylene glycol, propylene glycol, 1,4-butanediol neopentylglycol and pentaerythritol.

7. A process as defined in claim 1 wherein the resultant liquified product is converted into a polyurethane by reaction with a mixture of an aliphatic polyisocyanate and an aromatic polyisocyanate, said polyisocyanates being present in said mixture in a ratio of 1:3 to 3:1.

8. A process as defined in claim 7 wherein said aromatic polyisocyanate is selected from the group consisting of toluene diisocyanate, diphenyl diisocyanate and naphthyl diisocyanate.

9. A process as defined in claim 1 in which said treatment is conducted in a continuously operating low pressure reaction zone and/or in a continuously or discontinuously operating high pressure reaction zone.

* * * * *